United States Patent
Kane

(10) Patent No.: US 11,828,647 B2
(45) Date of Patent: *Nov. 28, 2023

(54) METHOD AND APPARATUS FOR MEASURING OPTICAL PULSES

(71) Applicant: Mesa Photonics, LLC, Santa Fe, NM (US)

(72) Inventor: Daniel J Kane, Santa Fe, NM (US)

(73) Assignee: MESA PHOTONICS, LLC, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,930

(22) Filed: May 5, 2022

(65) Prior Publication Data

US 2022/0271493 A1  Aug. 25, 2022

Related U.S. Application Data

(63) Continuation of application No. 16/864,970, filed on May 1, 2020, now Pat. No. 11,362,481.

(51) Int. Cl.
  *H01S 3/10* (2006.01)
  *G01J 11/00* (2006.01)
  *H01S 3/00* (2006.01)

(52) U.S. Cl.
  CPC .............. *G01J 11/00* (2013.01); *H01S 3/0057* (2013.01); *H01S 3/0078* (2013.01); *H01S 3/10023* (2013.01)

(58) Field of Classification Search
  CPC ........ H01S 3/11; H01S 3/0057; H01S 3/0078; H01S 3/10023
  See application file for complete search history.

(56) References Cited

U.S. PATENT DOCUMENTS

| | | | |
|---|---|---|---|
| 3,970,926 | A | 7/1976 | Rigby et al. |
| 5,367,375 | A | 11/1994 | Siebert |
| 5,530,544 | A | 6/1996 | Trebino et al. |
| 5,754,292 | A | 5/1998 | Kane et al. |
| 6,008,899 | A | 12/1999 | Trebino et al. |
| 6,219,142 | B1 | 4/2001 | Kane |
| 6,885,442 | B1 | 4/2005 | Nugent et al. |
| 7,023,556 | B2 | 4/2006 | Dorrer |
| 7,039,553 | B2 | 5/2006 | Nugent et al. |
| 7,130,052 | B1 | 10/2006 | Kane |
| 7,450,618 | B2 * | 11/2008 | Dantus ............... G01N 21/6402 372/27 |

(Continued)

OTHER PUBLICATIONS

E. B. Treacy, "Measurement and interpretation of dynamic spectrograms of picosecond light pulses," J. Appl. Phys. 42, 3848-3858 (1971).

(Continued)

*Primary Examiner* — Kinam Park

(57) ABSTRACT

A pulse analysis system or method includes a frequency filter that receives an ultrafast pulse under test and disperses the pulse under test over a frequency range. The frequency filter separates the pulse under test into component frequency slices and provides the frequency slices to a detector coupled to a digitizer, which processes the digitized signal and collects a sonogram characteristic of the pulse under test. The frequency slices are arranged to overlap. Ptychography is performed on the sonogram to obtain characteristics of the pulse under test.

22 Claims, 6 Drawing Sheets

(56) References Cited

U.S. PATENT DOCUMENTS

| | | | |
|---|---|---|---|
| 7,493,227 | B2 | 2/2009 | Ozcan et al. |
| 7,526,701 | B2 | 4/2009 | Wu et al. |
| 7,630,873 | B2 | 12/2009 | Bischoff et al. |
| 8,068,230 | B2 * | 11/2011 | Kane ................... G01J 11/00 356/450 |
| 8,082,117 | B2 | 12/2011 | Ozcan et al. |
| 8,135,094 | B2 | 3/2012 | Gorday |
| 8,311,069 | B2 * | 11/2012 | Dantus ................. H01S 3/235 372/21 |
| 8,675,699 | B2 * | 3/2014 | Dantus ................. G01J 11/00 372/25 |
| 8,953,166 | B2 | 2/2015 | Bowlan et al. |
| 9,159,119 | B2 | 10/2015 | Schechtman et al. |
| 9,202,295 | B2 | 12/2015 | Roberts et al. |
| 9,274,024 | B2 | 3/2016 | Humphry et al. |
| 9,322,791 | B2 | 4/2016 | Humphry et al. |
| 9,423,307 | B2 | 8/2016 | Kane |
| 9,426,455 | B2 | 8/2016 | Horstmeyer et al. |
| 9,497,379 | B2 | 11/2016 | Ou et al. |
| 9,784,640 | B2 | 10/2017 | Humphry et al. |
| 9,816,861 | B2 | 11/2017 | Streeter et al. |
| 9,933,467 | B1 | 4/2018 | Stein et al. |
| 10,394,011 | B2 | 8/2019 | Cohen et al. |
| 10,466,184 | B2 | 11/2019 | Maiden |
| 11,362,481 | B2 * | 6/2022 | Kane ................... H01S 3/11 |
| 2011/0211600 | A1 * | 9/2011 | Dantus ................. H01S 3/0057 372/25 |
| 2018/0329272 | A1 | 11/2018 | Muir et al. |
| 2020/0142175 | A1 * | 5/2020 | Cohen ............... G02B 21/0084 |

OTHER PUBLICATIONS

Chilla and Martinez, "Direct determination of the amplitude and the phase of femtosecond light pulses," Opt. Lett. 16, 39-41 (1991).
D. J. Kane, et al., "Simultaneous measurement of two ultrashort laser pulses from a single spectrogram in a single shot," J. Opt. Soc. A, 14, 935-943, (1997).
D. J. Kane, "Recent progress toward real-time measurement of ultrashort laser pulses," IEEE J. Quantum Electron., 35, 421-431, (1999).
Daniel J. Kane, "Principal components generalized projections: a review [Invited]," J. Opt. Soc. Am. B 25, (2008).
D. J. Kane, et al., "Real-time inversion of polarization gate frequency-resolved optical gating spectrograms," Appl. Opt. 42, 1140-1144 (2003).
D. J. Kane, "Real-Time Measurement of Ultrashort Laser Pulses Using Principal Component Generalized Projections," IEEE J. Selec. Topics Quant. Elec. 4, 278-284 (1998).
K. W. Delong et al., "Improved ultrashort pulse-retrieval algorithm for frequency-resolved optical gating", J. Opt. Soc. Am. A 11, 2429-2437 (1994).
K. W. Delong et al., "Pulse retrieval in frequency-resolved optical gating based on the method of generalized projections," Opt. Lett. 19, 2152-2154 (1994).
R. Trebino et al., "Using phase retrieval to measure the intensity and phase of ultrashort pulses: frequency-resolved optical gating," J. Opt. Soc. Am. A 10, 1101-1111 (1993).
Daniel J. Kane,"New simplified, algorithm for cross-correlation frequency resolved optical gating," Proc. SPIE 8611, 86110Q (Mar. 15, 2013).
Pavel Sidorenko, et al., "Ptychographic reconstruction algorithm for frequency-resolved optical gating:super-resolution and supreme robustness," Optica, 3,1320-1330 (2016).
Pavel Sidorenko, et al., "Ptychographic reconstruction algorithm for frequency-resolved optical gating:super-resolution and supreme robustness: erratum," Optica 4,1388 (2017).
Daniel J. Kane, Rick Trebino, "Charaterization of Arbitrary Femtosecond Pulses Using Frequency-Resolved Optical Gating," IEEE J. Quantum Electron., 29, 571-579, (1993).
E. Yudilevich et al., "Restoration of signals from their signed Fourier-transform magnitude by the method of generalized projections," J. Opt. Soc. Am. A 4, 236-246 (1987).
Y. Yang et al., "Projection-based blind deconvolution," J. Opt. Soc. Am. A 11, 2401-2409 (1994).
R. Beinert, G. Plonka, "Ambiguities in one-dimensional discrete phase retrieval from Fourier magnitudes," J Fourier Anal Appl 21, 1169-1198 (2015), preprint.
R. Beinert, G. Plonka, "One-Dimensional Discrete-Time Phase Retrieval." https://doi.org/10.1007/978-3-030-34413-9_24 (2020). Book: Nanoscale Photonic Imaging, Chap 24.
Derryck T. Reid, "Algorithm for Complete and Rapid Retrieval of Ultrashort Pulse Amplitude and Phase from a Sonogram," IEEE J. Quantum Electron 35, 1584-1589 (1999).
B. Luther-Davies, et al., "Evaluation of Material Dispersion in Low Loss Phosphosilicate Core Optical Fibers," Optics Communications 13, 84-88 (1975).
D. N. Payne, A. H. Hartog, "Determination of the Wavelength of Zero Material Dispersion in Optical Fibres by Pulse-Delay Measurements," Electronic Letters 13, 627-628 (1977).
Li-Hao Yeh, et al., "Experimental robustness of Fourier ptychography phase retrieval algorithms," Optics Express 23, 33215-33240 (2015).
V. Wong and I. A. Walmsley, "Ultrashort-pulse characterization from dynamic spectrograms by iterative phase retrieval," J. Opt. Soc. Am B 14, 944-949 (1997).
T. Witting, et al., "Retrieval of attosecond pulse ensembles . . . ," J. Phys. B: At. Mol. Opt. Phys., in press https://doi.org/10.1088/1361-6455/ab94ca (2020).
A. M. Maiden, J. M. Rodenburg, "An improved ptychographical phase retrieval algorithm for diffractive imaging, " Ultramicroscopy 109,1256-1262 (2009).
A. M. Maiden, et al., "Superresolution imaging via ptychography," J. Opt. Soc. Am. A 28, pp. 604-612 (2011).
M. Guizar-Sicairos, J. R. Fienup, "Phase retrieval with transverse translation diversity: a nonlinear optimization approach," Optics Express 16, pp. 7264-7278 (2008).
R. Horstmeyer, C. Yang, "A phase space model of Fourier ptychographic microscopy," Optics Express 22, 338-358 (2014).
P. C. Konda et al., "Fourier ptychography: current applications and future promises," Optics Express 28, 9603-9630 (2020).
D. Spangenberg, et al., "Ptychographic ultrafast pulse reconstruction," Optics Letters 40, 1002-1005 (2015).
D. J. Kane et al., "One Megahertz Single-Shot Measurement of Ultrafast Laser Pulses," in CLEO, OSA Technical Digest (Optical Society of America, 2020), paper SM4H.7.
D. J. Kane et al., "Multiplexed Signal Recovery for Ultrafast Waveform Measurement," in CLEO, OSA Terchnical Digest (online) (Optical Society of America, 2018), p. JTh2A.161.
D. J. Kane et al., "Very high-speed single-shot ultrafast pulse measurement," Photonics West (San Francisco) Conference 11270-21 (2020).
D. J. Kane et al., "Measuring long duration ultrafast optical waveforms using a hybrid optical-electronic system," Photonics West (San Francisco) Paper 10522-48 (2018).
Y. Ozeki et al., "Complete Charaterization of Picosecond Optical Pulses in Long-Haul Dispersion-Managed Transmission Systems," IEEE Photon. Tech. Lett. 17, 648-650 (2005).
Y. Ozeki et al., "Electrooptics Spectral Shearing Interferometry Using a Mach-Zehnder Modulator With a Bias Voltage Sweeper," IEEE Photn. Tech. Lett. 18, 911-913 (2006).
D. R. Larson and N. G. Paulter Jr., "A measurement of propagation delay," Metrologia 44, 64-68 (2007).
S. E. Mechels, et al., "Accurate Measurements of the Zero-Dispersion Wavelength in Optical Fibers," J. of Research of NIST 102, 333-347.
Rodhe and Schwartz, "Application Note: Group Delay measurements with Signal and Spectrum Analyzers," 1EF98-1E.
Hewlett-Packard, "Application Note 77-4: Swept Frequency Group Delay Measurements," AN77-4 (Sep. 1968).

(56) References Cited

OTHER PUBLICATIONS

Ma, et al., "Spatiotemporal Noise Characterization for Chirped-Pulse Application Systems," Nature Communications, Feb. 4, 2015, pp. 1-5.

* cited by examiner

METHOD AND APPARATUS FOR MEASURING OPTICAL PULSES

RELATED APPLICATION

The present application claims priority as a continuation of U.S. patent application Ser. No. 16/864,970, filed May 1, 2020, which parent application is incorporated by reference in its entirety into the present application.

GOVERNMENT RIGHTS

The U.S. Government has a paid-up license in this invention and the right in limited circumstances to require the patent owner to license others on reasonable terms as provided for by the terms of Grant No. DOE DE-SC0013866.

BACKGROUND

1. Field

The present invention relates to a method and apparatus for obtaining phase or other information from ultrafast electromagnetic pulses and may be used to provide multi-dimensional ultrafast laser diagnostics, among other applications.

2. Background

Ultrafast laser systems have a large number of applications in biochemistry, chemistry, physics, and electrical engineering. These systems generate laser pulses with durations of ten picoseconds or less and are used to explore kinetics in proteins, examine carrier relaxation in semiconductors, or image through turbid media. They are also used as an ultrafast probe in electronic circuits. By using ultrafast diagnostic systems based on such ultrafast laser systems, highly advanced semiconductors, electronic circuitry, and even biomedical products can be developed and tested for commercial applications. New applications such as coherent control of chemical reactions require ultrashort pulses shaped in both intensity and phase. The continued development of these applications will require fast, high quality and easy-to-use ultrafast laser pulse diagnostics.

Techniques for measuring ultrashort pulses, that is, measuring the electric field envelope and the instantaneous frequency of a pulse under test, generally have limitations. Early techniques yielded only the intensity autocorrelation of the pulse. Later developments, such as interferometric autocorrelation, indirectly determined various phase distortions common to ultrashort pulses, but were unable to provide complete intensity and phase information about the pulse.

Work has been done to extract the time-dependent intensity I(t) and the phase $\varphi(t)$ from these ultrashort pulses using iterative methods. Fundamental inherent ambiguities, including the direction of time, sometimes remain. Some methods cannot determine, for example, the sign of the chirp unless a second measurement is made after propagating the pulse through a known dispersive medium. Other methods yield only I(t) or require a streak camera and hence lack sufficient temporal resolution. Still other methods have been developed to measure the phase $\varphi(t)$ but do not yield the intensity. Simultaneous time and frequency information is required for retrieval of the full complex electric field. Additional weaknesses include limited time and frequency windows and limited dynamic range. Convergence issues remain in iterative pulse measurement techniques. Simplified retrieval strategies or simplified measurement strategies can produce problems with uniqueness.

Time-frequency measurements of ultrashort pulses were first reported by Treacy in 1971. The Treacy method disperses the input pulse in frequency, selects (filters) a portion of the frequency components to produce another pulse, and then cross correlates the newly formed pulse with the original input pulse. Scanning the frequency filter (window) over all of the frequencies contained in the original pulse produces a three-dimensional plot of intensity versus frequency and time which is commonly referred to as a sonogram. This method was refined by Chilla and Martinez with the development of frequency domain phase measurement or FDPM. Since the arrival time of each frequency filtered pulse is given by the derivative of the phase (in the frequency domain) with respect to frequency, integration over the frequencies of the arrival time for each pulse gives the phase of the pulse in the frequency domain. Coupling this phase result with the spectrum of the pulse gives the Fourier transform of the complex electric field.

Frequency resolved optical gating (FROG) is an ultrafast laser diagnostic that can measure the intensity and phase of an ultrashort laser pulse. In a simple form, a FROG device produces a spectrogram of the pulse. A spectrogram is a three-dimensional plot of intensity versus frequency and time delay, showing the spectral components of time slices of the pulse. While the spectrogram of the pulse produced by the FROG device serves as an intuitive illustration of the pulse, it is difficult to obtain quantitative information about the pulse from the spectrogram. Subtleties in the pulse structure may go unnoticed without knowledge of the actual pulse. To obtain the original pulse from its spectrogram, the phase of the spectrogram typically is determined through two-dimensional phase retrieval. Two-dimensional phase retrieval can be slow and may have convergence issues. Also, many FROG implementations can have difficulties in analyzing pulses having large temporal ranges.

Sonograms are conceptually similar to spectrograms and can be analyzed in similar fashion. For example, the method discussed by Chilla and Martinez can be used to form a sonogram from an input pulse. The sonogram is formed by spectrally filtering the input pulse and measuring the intensity of the filtered pulse. This process is repeated for each spectral range to span the pulse and the resulting data set is the sonogram. Two-dimensional phase retrieval is then performed on the sonogram data set. The FROG style of two-dimensional phase retrieval can be used to extract the intensity and phase of a pulse from its sonogram.

Other methods for sonogram measurement include the direct spectral phase detection (DSPD) method described by Ozeki, et al., "Complete Characterization of Picosecond Optical Pulses in Long-Haul Dispersion-Managed Transmission Systems," IEEE Photonics Technology Letters, vol. 17, 648-650 (2005). This DSPD method proceeds by dividing the pulse under test into two identical pulses. One is detected directly with a photodetector (PD1), while the other is optically filtered before being detected with another photodetector (PD2). The Ozeki, et al., DSPD method determines the frequency difference between the two photodetector signals, which has the effect of down converting the frequency of the signals. A lock-in amplifier determines the relative amplitude and phase between the signals output from photodetectors PD1 and PD2. This DSPD method uses an optical bandpass filter that samples a single frequency range at a time so that this process is repeated to determine the sonogram of the input pulse.

SUMMARY OF THE PREFERRED EMBODIMENTS

An aspect of the present invention provides a method for determining characteristics of one or more waves. Another aspect of the present invention provides a method for determining characteristics of an unknown ultrafast electromagnetic wave including measuring the arrival time of frequency components of the unknown ultrafast electromagnetic wave and then processing the frequency dependent arrival time data determined from the unknown ultrafast electromagnetic wave.

Another aspect of the present invention measures the phase difference between frequency filtered portions of an ultrafast pulse under test. The phase differences correspond to arrival time.

Another aspect of the present invention extracts the intensity and phase information for the ultrafast pulse under test from frequency filtered portions of the ultrafast pulse under test.

According to an aspect of the present invention, a pulse analysis apparatus includes a frequency filter that receives one or more pulses under test and disperses the one or more pulses under test over a total frequency range. The frequency filter passes a first pulse portion of a dispersed pulse under test at a first position, the first pulse portion extending over a first portion of the total frequency range. The frequency filter passes a second pulse portion of a dispersed pulse under test at a second position distinct from the first position, the second pulse portion extending over a second portion of the total frequency range. The apparatus includes a detector coupled to receive output pulse portions from the frequency filter and output an electrical pulse signal corresponding to the pulse under test and the apparatus includes collection optics coupled to the frequency filter to direct the output pulse portions to the detector. Analysis electronics are coupled to receive and digitize the electrical pulse signal, the analysis electronics storing a sonogram corresponding to the one or more pulses under test. The sonogram comprises sequences of digitized values of the electrical pulse signal, the digitized values within a sequence obtained at a number of time intervals, and the sequences obtained at a plurality of frequency ranges including the first and second portions of the total frequency range, each of the plurality of frequency ranges corresponding to at least one sequence of digitized values of the electrical pulse signal. The first portion of the total frequency range partially overlaps the second portion of the total frequency range. The analysis electronics is adapted to perform phase retrieval on the sonogram.

According to another aspect of the present invention, an ultrafast pulse analysis apparatus includes a sampling system to receive at least one pulse under test and to define a plurality of sampling bins each spanning a frequency range of the at least one pulse under test. The plurality of sampling bins are arranged over different frequency ranges so that the plurality of sampling bins define a continuous frequency range over at least a portion of a total frequency range of the at least one pulse under test. Adjacent ones of the sampling bins overlap in frequency ranges. Collection optics receive a plurality of pulse portions, each pulse portion derived from the pulse under test and having a frequency range corresponding to at least one of the sampling bins. One or more detectors is coupled to receive the plurality of pulse portions from the collection optics and to output an electrical pulse signal corresponding to each of the plurality of pulse portions. Analysis electronics is coupled to receive and digitize the electrical pulse signal. The analysis electronics stores a sonogram corresponding to the at least one pulse under test wherein the sonogram comprises sequences of digitized values of the electrical pulse signal at a plurality of time intervals, the digitized values within a sequence corresponding to the pulse portion defined by the at least one sampling bin. The analysis electronics performs phase retrieval on the sonogram.

BRIEF DESCRIPTION OF THE DRAWINGS

The accompanying drawings, which are incorporated into and form a part of the specification, illustrate several embodiments and, together with the description, illustrate preferred aspects of the embodiments. The drawings are illustrative and are not to be construed as limiting.

DESCRIPTION OF THE PREFERRED EMBODIMENTS

Aspects of certain preferred embodiments provide methods and apparatus for characterizing, for example, an ultrafast laser pulse or other ultrafast pulse. Certain of these embodiments obtain measurements on such an ultrafast pulse and process the resulting data to provide a sonogram characteristic of the ultrafast pulse. Some implementations allow for the simultaneous or parallel measurement of a number of frequency-resolved channels so that the sonogram may, as desired, be obtained in a single-shot manner or using a limited number of system configurations. Other implementations may provide for individually measuring frequency-resolved channels, often implemented with mechanical translation between frequency channels, which may obtain a desired sonogram using simpler optical systems or less complicated electronics. Particularly preferred implementations analyze the resulting sonogram using a phase retrieval strategy adapted to characterize the preferred input ultrafast pulse to provide information about modulations or distortions in the input ultrafast pulse. Certain particularly preferred implementations implement a robust phase retrieval strategy on the measured sonogram that accommodates pulses of both ultrashort and comparatively long durations and that converges well across a range of pulse characteristics.

While preferred implementations are described here in terms of obtaining a sonogram characteristic of the input ultrafast pulse, aspects of the systems and methods described here are advantageous to implementing other analysis techniques. For example, aspects of the described implementations can be used to obtain group delay information, which can then be used to determine the phase of the input pulse under some circumstances.

Figure 1:
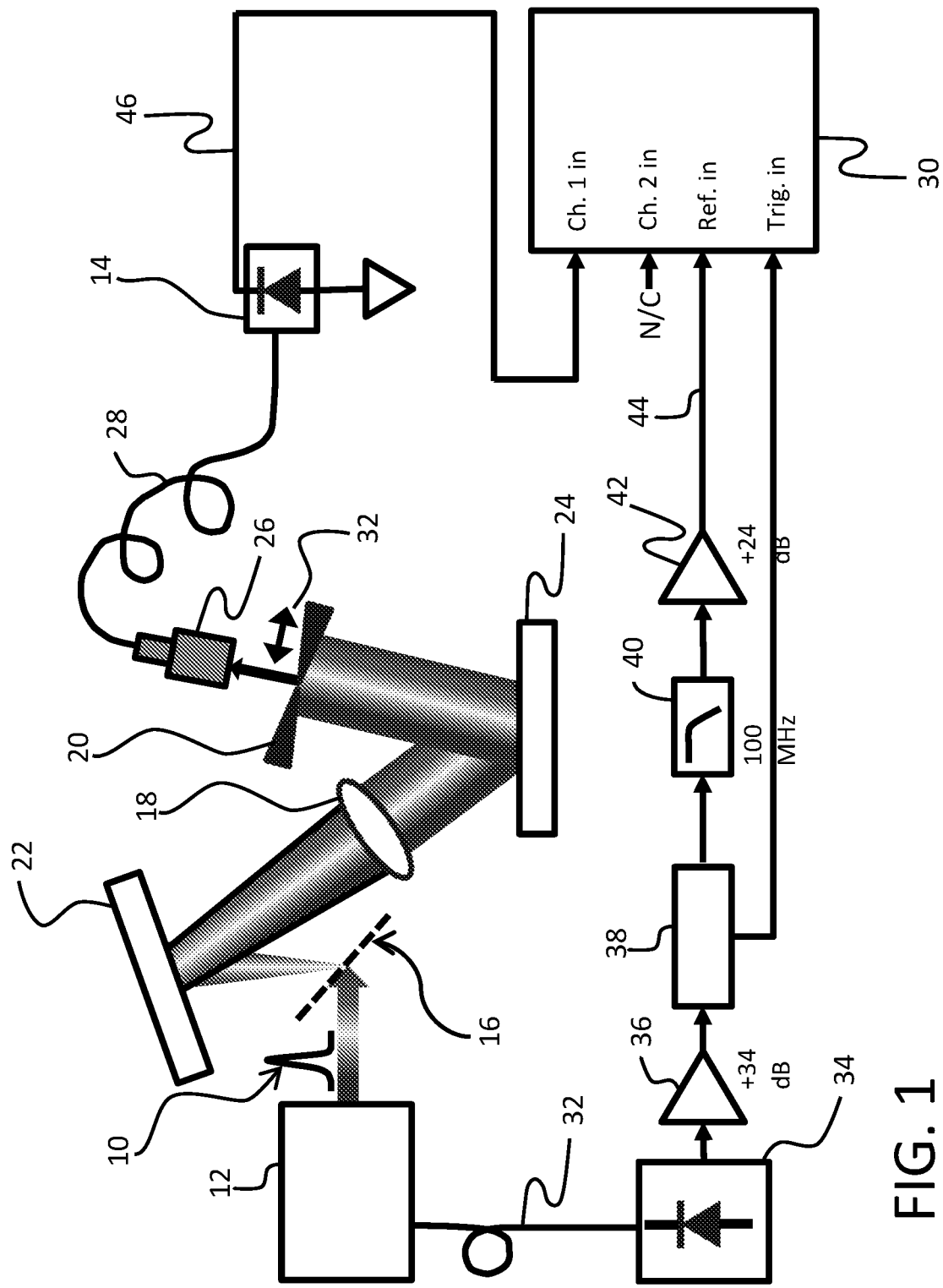
FIG. 1 illustrates a device and method to measure the sonogram of a pulse. The input ultrafast pulse is spectrally (frequency) filtered, passed to a detector, and an electronic digitizer measures the arrival time of each spectrally filtered component.

FIG. 1 shows a preferred device and a preferred method for measuring phase and intensity characteristics of an input ultrafast pulse, such as an ultrafast laser pulse. In some preferred implementations, the FIG. 1 apparatus and method obtains a sonogram characteristic of the input ultrafast pulse under test. One of the functions illustrated in FIG. 1 disperses the ultrafast pulse under test into constituent frequencies to provide a number of frequency-selected pulse slices to a detector and electronics for time resolved detection and analysis. The FIG. 1 device and its associated method are particularly advantageous when used to characterize ultrafast pulses with durations or changes near the limit of the detector or the associated electronics, or of both. In such a circumstance, time domain detection of the ultrafast pulse may result in comparatively few samples through the transient portion of the pulse. For that same ultrafast pulse, the FIG. 1 and other implementations preferably obtain samples at many different frequency slices through the pulse. For example, it is currently experimentally possible to obtain intensity versus time samples from over two hundred distinct frequency slices through that ultrafast pulse. The comparatively large number of frequency slices preferably are used to better characterize the ultrafast pulse and to provide greater insight into the pulse.

The FIG. 1 device receives a pulse under test 10 from a pulse source 12, disperses the pulse under test 10 over its constituent frequencies, filters the dispersed pulse to select one or more frequency ranges and samples or measures the intensity of the frequency-selected ranges of the pulse under test 10 as a function of arrival time at the photodiode or other detector 14. Preferably the pulse under test 10 is an ultrafast laser pulse. The arrival time for a pulse under test is not a single number since the pulse intensity (assuming a square law detector) varies as a function of time within each of the plural frequency-selected slices on the time scale significant to the FIG. 1 implementation. Detected signals are digitized and stored so that, when preferred, the accumulated data makes up a sonogram that can be analyzed to provide characteristics such as the amplitude and phase of the pulse under test 10.

FIG. 1 illustrates a particularly preferred implementation that performs frequency dispersion using a constant delay style frequency filter having a transmission grating 16 as its input, a lens 18 with a focal length f, and a slit 20. The grating 16 and the slit 20 are separated by 2f, and the lens 18 is placed midway between the grating 16 and slit 20 so that the slit 20 is at the Fourier plane. The lens 18 to grating 16 and lens 18 to slit 20 distances preferably are selected to ensure that the optical layout provides a zero-dispersion configuration. Planar mirrors 22 and 24 fold the desired optical path so that the FIG. 1 device can be made more compact. The grating 16 most preferably disperses the constituent frequencies of the pulse under test 10, in a generally continuous manner, and the other optics of the filter cause the constituent frequencies to be laterally dispersed in order across the Fourier plane.

The slit 20 is a hard aperture that passes a range of the frequencies laterally dispersed along the Fourier plane; the slit 20 can be modeled as a boxcar function, $\Pi(\omega)$, that passes a range of frequencies and blocks other frequencies. In this configuration the slit 20 acts as a spectral or frequency filter to sample a portion of the pulse over a range of frequencies defined by the slit width and position. Coupling optics 26 collect the spectrally filtered pulse from the slit 20 and couple it into an optical fiber 28, which provides the spectrally filtered pulse to the detector 14. In the FIG. 1 implementation, where the pulse under test might be the 1.56 µm output from an Er:Fiber laser acting as the pulse source 12, an appropriate detector 14 may be a commercially available fiber coupled 12 GHz photodiode. Photodiode 14 performs time domain detection of the spectrally filtered output pulse, $\tau_o(\Omega, t)$, where $\Omega$ is the offset optical frequency defined by the slit position, and t is time. Because the photodiode 14 is a square law detector, the detected pulse is the time varying intensity profile of the pulse, $|\tau_o(\Omega, t)|^2$.

For a first slit position of the FIG. 1 device, the output of the fiber coupled photodiode 14 is provided to digitizer 30 at its channel 1 input, where the signal is digitized and stored as a first intensity vs. arrival time profile for a first frequency-selected slice of the pulse under test. The FIG. 1 frequency filter preferably provides a computer-controlled translation stage for the slit so that the slit 20 can be laterally translated across the Fourier plane of the filter as desired to successively sample different frequency ranges or bins. For the typical repetitively pulsed ultrafast laser source, numerous pulses may be sampled by the frequency filter over each selected frequency range. Preferably this allows the FIG. 1 device and method to sample the pulse at each frequency range a number of times such as one thousand repetitions. Then, in preferred circumstances where it is advantageous, the pulse signal or data at each frequency range can be averaged to provide better (e.g., lower noise) signals. There are instances where such averaging is unnecessary or undesirable. Otherwise, the electronics coupled to the photodiode sample, accumulate and average the signal or data at each slit position.

After the first frequency selected slice of the pulse under test is measured and passed to the digitizer or other processing electronics, with storage and averaging as desired, the translation stage moves slit 20 laterally across the Fourier plane to sample a second frequency selected slice of the pulse under test. With the slit 20 at a second lateral position on the Fourier plane so the slit samples a second range of frequencies of the pulse under test 10, the digitizer 30 captures a second data set by digitizing the second intensity profile from the photodiode 14 and stores that data set as a second component part of the sonogram for the pulse under test. Here again, the system and method may accumulate or average the signal or data at the second slit position as desired. After the system and method obtain the signal and data for the second slit position, the process is repeated so that the stage translates the slit across the frequency range of the pulse under test and the digitizer 30 digitizes and records the high-speed electronic signal from the photodiode 14 for each frequency slice of the pulse. The end result is a sonogram recorded by the digitizer 30; the sonogram typically is stored in memory for analysis.

The specific FIG. 1 implementation uses a digitizer 30 with a bandwidth of 2.5 GHz. This is a comparatively high performance commercially available data acquisition card; the inventor anticipates that digitizers will continue to improve and that such improved digitizers will provide desirable improvements to the FIG. 1 implementation and other implementations discussed here. Digitizers record data fast and can stream data to buffer memory and onto a hard drive. Oscilloscopes include different but also useful digitizing circuitry and can be used when streaming is not required. Still other signal acquisition strategies might be implemented.

Preferably the digitizer 30 is provided with a trigger signal corresponding to the output of the pulse under test and a reference signal phase locked to the repetition frequency of the pulse under test. Both the trigger signal and the reference signal derive from the pulse source and so include the various frequencies of the pulse under test. To generate the trigger and reference signals, a portion of the pulse under test 10 is split off prior to its dispersion. In the FIG. 1 implementation, this is accomplished using the monitor output from the pulse source 12, which is provided to optical fiber 32 and its connected photodiode 34. In another implementation, a pulse source 12 passes the pulse under test 10 through an optical splitter to create an equivalent monitor output, which is coupled into optical fiber 32, which is typically part of fiber coupled photodiode 34. In this implementation, photodiode 34 may be a commercially available 5 GHz InGaAs photodetector. Photodiode 34 receives the complete (not dispersed) pulse under test, detects the signal and outputs the signal to amplifier 36. Splitter 38 splits the amplified signal; one component of the split signal is provided to the digitizer 30's trigger input.

The trigger component of the monitor pulse signal repeats at the repetition rate of the pulse under test and so provides the digitizer 30 the appropriate trigger signal for sampling from the photodiode 14. When the pulse source is an Er:Fiber laser, the repetition rate may be about 100 MHz. The other component of the monitor pulse signal from the splitter 38 is low pass filtered by low pass filter 40 and then passed to amplifier 42, which amplifies the signal and provides the result to the reference signal input of digitizer 30. RF attenuators are used as needed to match the input power requirements of the RF components. In this implementation, the low pass filter 40 is selected according to the pulse under test repetition rate; in other configurations a different pass frequency can be selected.

Using the pulse source 12 to generate a trigger signal and a reference signal 44 for the detection electronics is particularly preferred to improve timing accuracy. The FIG. 1 configuration can be implemented without a trigger signal or a reference signal, as well. The trigger signal is a trigger to start acquiring the frequency filtered ultrafast pulse 10. The digitizer 30 preferably uses the reference signal to the digitizer 30 as a timing reference and the digitizer 30's measurements of the frequency selected pulse signal 46 are made with reference to the reference signal 44 if one is available. A signal phase-locked to the repetition rate can be used as the reference for additional timing precision. Thus, the arrival time of the signal 46 is determined as a relative delay (which can be negative) with respect to the trigger signal. By deriving the trigger and reference signals from the pulse itself, the FIG. 1 and other implementations achieve precise registration between the start of timing and the pulse which allows far more repeatable and accurate timing of the pulse's time varying intensity. Most high-speed data acquisition systems have a reference frequency input which is usually 10 or 100 MHz. If the laser repetition frequency is neither 10 nor 100 MHz, a phase-locked loop can be used to lock a reference frequency to the pulse source 12 repetition frequency.

Sonograms do not need good spectral resolution, but preferably are obtained with good time resolution, preferably in the manner discussed here. In this, sonograms differ from spectrograms, which preferably are obtained with a spectrometer with good spectral resolution (especially for long pulses or wave forms) but generally do not require good time resolution in the gate. For the sonograms discussed here, the bandwidth of the temporal waveform is a function of the spectral width of the frequency filter. Thus, in preferred implementations, the sonogram is preferably obtained using a spectral resolution selected according to the bandwidth of the digitizer of FIG. 1 or the corresponding electronics in other embodiments.

Preferably the FIG. 1 implementation uses a detector 14 with a bandwidth larger than the spectral width of the slit 20 and the implementation preferably also uses a high bandwidth digitizer 30 so that the digitizer bandwidth is larger than the spectral width of the slit 20. Temporal matching of the waveform of the pulse under test also reduces the temporal accuracy requirements of the digitizer. Preferred devices and methods have been implemented with optical resolutions on the order of a few wavenumbers (cm$^{-1}$) to a few hundredths of a wavenumber. Depending on the slit 20 width, it may be desirable to select a higher speed detector that what is illustrated for FIG. 1, particularly for the analysis described below with respect to FIG. 2. Selecting the bandwidth of the photodiode and the detection electronics with respect to the (frequency) resolution of the grating 16 or the slit 32 is possible using standard grating spectrometer designs. Preferably, the digitizer 30 is arranged to write the measured data sets to computer memory.

In a preferred implementation the size of the slit or, equivalently, the sampled frequency range is selected so that the pulse intensity and phase changes sufficiently little across the slit as to be considered constant or linear. When the pulse under test input to the sonogram measurement system is transform limited, phase at the Fourier plane where the slit is located is constant. If the pulse has chirp, then the phase will change as a function of slit position, and the transmitted pulse spectrum is given by:

$$E_0 e^{-i\varphi(\omega-\Omega)} \Pi(\omega-\Omega),$$

where $\varphi(\omega-\Omega)$ is the frequency domain phase and generally is a function of the frequency. $\Pi(\omega-\Omega)$ is the boxcar function discussed above. The time domain pulse is given by the Fourier transform of the complex spectrum:

$$\tau_o(\Omega,t) = \int E_0 e^{-i\varphi(\omega-\Omega)} \Pi(\omega-\Omega) e^{-i\omega t} d\omega.$$

When the time domain waveform is a sinc function, the phase $\varphi(\omega-\Omega)$ is constant across the slit. On a square law detector, the resulting waveform will be a $|\text{sinc}|^2$ function, and its Fourier transform will be a triangle function. When the phase across the slit is curved, the temporal shape of the pulse depends on the spectral phase.

The linear phase (across the slit) approximation gives $\varphi(\omega-\Omega) = \beta(\omega-\Omega)$. Then the transmitted complex spectrum is given by:

$$E_0 e^{-i\beta(\omega-\Omega)} \Pi(\omega-\Omega),$$

and the time domain spectral filtered pulse is given by the Fourier transform of the above function:

$$\tau_o(\Omega, t-\beta\Omega) e^{i\beta\Omega} = \int E_0 e^{-i\beta(\omega-\Omega)} \Pi(\omega-\Omega) e^{-i\omega t} d\omega$$

where the term $e^{-i\beta\omega}$ acts only as a time shift in the time domain. The phase offset produced by $\Omega$ is removed by the square-law detector and the detected waveform is just $|\tau_o(t-\beta)|^2$. The shape remains a $|\text{sinc}|^2$ function. Therefore, as the slit is tuned across different frequency ranges, the temporal waveform does not change, and the recorded frequency filtered pulse is constant for the different frequency ranges (except for jitter and other detection noise). The only variations are the time of arrival and the amplitude.

Selecting the slit size to achieve a sufficiently slowly varying pulse intensity and phase across the slit (or the sampling interval), allows the system to obtain the Fourier transform at the resolution of the frequency filter. Once the slit size is selected, the only variations are the arrival time of the pulse and the total integrated signal (equivalent to the amplitude). This allows the FIG. 1 and other implementations here to measure arrival times precisely enough for ultrafast pulses. Under these circumstances, the time precision needed is not on the order of a femtosecond, but on the order of the reciprocal of the bandwidth of the pulse, or about the duration of the transform limited (or near transform limited) pulse under test. The effective limit of the temporal precision is the aperture jitter of the analog-to-digital converter used to digitize the signal (e.g., within digitizer 30). Commercial high-speed analog-to-digital converters are available with aperture jitter on the order of 50 fs so that they can measure optical pulses on the order of 100 fs or less. The resulting bandpass of the measurement is bounded on the lower side by the optical filter bandwidth (i.e., the slit spectral bandwidth) and the upper side by the span of the frequency measurement (i.e., the total frequency range spanned by the slit positions, from edge to edge) or the reciprocal of the aperture jitter, whichever is less. Aperture jitter is a characteristic of analog to digital converters. Because of the linear phase assumption, frequencies less than the optical bandpass are not measured. This bandpass reflects a simple group delay analysis of sonogram data obtained for the FIG. 1 system; when a more sophisticated phase retrieval is performed, the bandpass can be expanded.

The discussion now presents exemplary specific details of the FIG. 1 implementation to illustrate its capabilities; this discussion is not intended to be limiting. Pulse source 12 in this specific implementation is a 1560 nm MenloSystems T-Light Erbium-doped fiber laser with a free-space output of about 150 mW of nearly transform limited, less than 90 fs pulses at a repetition rate of approximately (just under) 100 MHz. The pulse 10 output by the laser 12 is filtered using one half of a zero dispersion 4f (where f is the lens focal length) stretcher-compressor design, which acts as a zero-dispersion frequency filter. An adjustable slit (Edmund Optics) is used to adjust the bandpass of the optical system.

A transmission grating with about 966 grooves/mm (Lightsmyth) is used as frequency dispersive element 16. The grating 16 is most efficient in the Littrow configuration, and by using a 500 mm focal length lens 18, the initial system dispersion is about 1.5 nm/mm. The lens to grating and lens to slit distances preferably are selected to ensure that the complete optical system provides the preferred zero dispersion configuration. The specific slit 20 used in this illustration could be set to a frequency passband as low as 1.2 GHz (6 μm wide), which is a narrow bandwidth or passband. A fiber collimator 26 mounted behind the slit couples the filtered light into a single mode SM-28 optical fiber (23 ps$^2$/km dispersion). A (Newport) 12 GHz fiber coupled high speed IR-detector 14 (photodiode) detects the spectrally filtered optical pulse transmitted by the slit. The slit 20 is moved across the Fourier plane of the zero-dispersion stretcher/compressor using a computer-controlled (Applied Scientific Instrumentation) precision motorized linear translation stage (<0.1 μm resolution corresponding to ≈20 MHz of optical frequency).

The digitizer 30 used in this specific implementation is a Keysight U5310 data acquisition card, which is under computer control. The Keysight digitizer 30 acquires the waveforms when triggered by the laser optical monitor output (as described above). Averaging of multiple waveforms can be performed as necessary or as desired. When scanning the slit position, a set of files corresponding to each position is generated. For each wavelength (i.e., slit position), multiple waveforms (typically 1000) acquired by the digitizer are added together and averaged to improve the signal-to-noise ratio. While the FIG. 1 implementation preferably uses a digitizer, alternative data acquisition and processing systems are available and can be used, including high-speed digitizing oscilloscopes and other forms of data acquisition electronics that convert an analog signal to digital values, typically in combination with data storage and processing.

For either the illustrated implementation of FIG. 1 or other implementations of the general strategy, the system or method preferably determines the relative arrival time (or delays) of the peaks of the measured pulses by upsampling the waveforms to a time spacing of a few picoseconds or less. Such upsampling is advantageous in providing sufficient resolution for the desired delay determinations. Preferably the upsampling is performed after each of the waveforms is averaged, but the order can be reversed or under some circumstances it may be possible to avoid upsampling or averaging. Preferably the averaging and upsampling are initiated as desired as procedures on a host, control or other computer including, for example, on the illustrated digitizer in combination with a control and analysis computer.

Preferred embodiments may then initiate a procedure on a computer to determine a response function. The system or method preferably determines the response function by averaging the digitized signal waveforms across several different slit (frequency) positions so that the response function preferably is digitized at different frequency passbands. The system or method then initiates a procedure on a computer to perform a correlation between the response function and the upsampled, measured waveforms to obtain the relative arrival time of the peak of each of the respective frequency-selected waveforms. This provides a set of relative arrival time or delay values, one for each of the peaks of the frequency ranges selected from the pulse under test. The assumption that intensity and phase is either constant or linear over the selected frequency range excludes frequencies below the optical bandpass. Because the relative delay values reflect the change in time as a function of changes in frequency, this data can be treated as a differential. The change in relative delay between adjacent frequency slices over the frequency difference, which is $$\frac{\Delta\tau}{\Delta\omega},$$

corresponds to the negative of the group delay. Integrating the negative of the group delay $$\frac{\Delta\tau}{\Delta\omega}$$

over all of the frequencies yields the phase, $\varphi(\omega)$, which is in the frequency domain. The time domain phase $\varphi(\tau)$ is obtained by Fourier transforming the frequency domain representation of the pulse, which is obtained by using the square-root (magnitude) of the spectrum of the pulse together with the measured phase.

While the sonogram capture outlined above is powerful and inexpensive, the above simple analysis of the sonogram relies on the assumption that only a constant or linear intensity and phase exists across each spectral element (i.e., the frequency group is only delayed—it is not distorted in any way). This works very well when the optical waveform is sampled at a frequency spacing comparable to the longest expected time duration. For longer duration waveforms, the intensity and phase may not be linear across the filter band. In such cases the waveform will contain higher order distortions that must be measured to faithfully reproduce the input signal. That is, the filtered optical waveform will be modulated, or slightly distorted, and proper analysis needs to respond to that modulation or distortion. These intensity and phase distortions correspond to the pulse sampled at higher spectral resolution. Unfortunately, because electronics can only measure the intensity of the filtered optical waveform, information contained in the optical waveform modulations and distortions is lost unless the electronics are fast enough to completely temporally resolve the optical waveform.

If the bandwidth of the electronics is greater than or equal to the optical bandwidth, phase retrieval on the sonogram can be used to extract the intensity and phase of the ultrafast pulse under test. Preferably, the frequency bandpass is known a priori. Preferably, the host, control or other computer implements a phase retrieval strategy such as the ptychographic inversion engine (PIE) to extract the ultrafast pulse waveform under test from the sonogram obtained above. There are some variations on the naming of PIE, including the use of "iterative" instead of inversion. PIE is used here to refer to these variations as well as to other variations such as the extended PIE. The PIE uses a steepest decent strategy to find an unknown function that is multiplied by, and scanned transversely with respect to, a known function. The PIE can be implemented to extract information from the sonogram including waveform modulations and distortions such as those associated with chirp. For PIE processing, sonogram data is preferably obtained so that adjacent frequency slices include overlapping frequency ranges. This configuration with sampling overlap in frequency is not required when the simpler group delay analysis reliably reproduces the phase.

The PIE has the advantage of meaningfully reducing the optical frequency sampling requirements as compared to other phase retrieval strategies such as the principal components generalized projections (PCGP) strategy. The PCGP strategy requires a Fourier transform relationship between the frequency axis and the time axis of the spectrogram $\Delta f = (N\Delta t)^{-1}$, where N is the number of points, $\Delta f$ is the frequency spacing, and $\Delta t$ is the time spacing. In contrast, the PIE allows temporal profiles to be collected and analyzed at arbitrary frequency separations: $I_{SONOGRAM}(\tau, \omega_t)$ where $\omega_t$ may be chosen independently from the frequency separations indicated by a Fourier transform relationship. This is especially advantageous for measuring temporally long pulses that are highly chirped and spectrally broad. Because the PIE is robust, if a good initial guess is available, only a relatively small amount of data is needed to recover the pulse.

Figure 2:
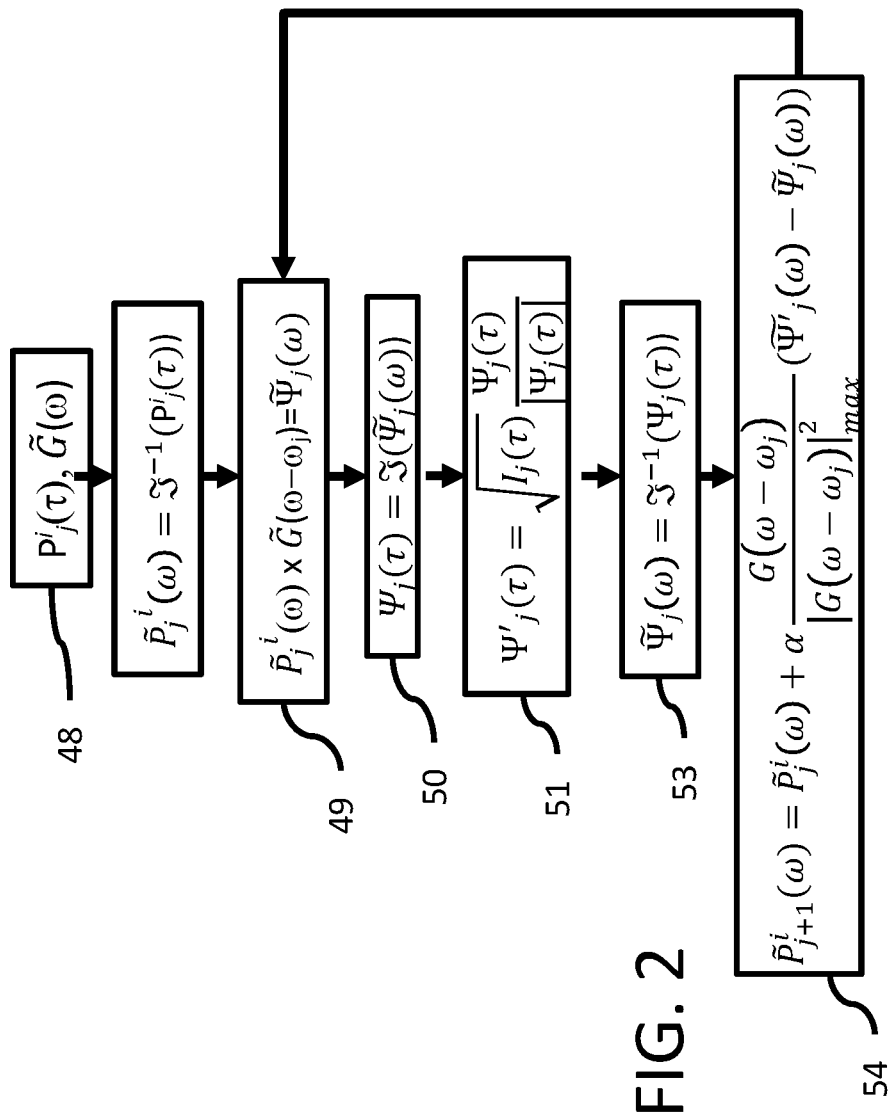
FIG. 2 shows aspects of a process flow for a preferred phase retrieval strategy that may be used with various of the measurement strategies described here.

FIG. 2 illustrates a preferred implementation of the PIE that can be used to analyze sonogram or similar data obtained by the FIG. 1 implementation or the other implementations described here. FIG. 2 illustrates an iterative process in which the gate $G_j(\omega)$ is "known" in that it can be reliably measured and the probe $P^i(\tau)$ is unknown and is to be obtained through the iterative process. Here, G is italicized to emphasize that it is in the frequency domain. The gate $G(\omega)$ corresponds to the frequency gate including the dispersion element 16 and the slit 32 shown in FIG. 1, for example. The gate function $G_j(\omega)$ corresponds to the $j^{th}$ element of the frequency filter $G(\omega)$. The probe $P^i(\tau)$ corresponds to the current estimate of the pulse for the $i^{th}$ iteration; the probe is made up of frequency slices identified by the index j with each probe element identified as $P^i_j(\tau)$. Here, the unitalicized P indicates that the probe is, at this point in the iterative process, a time $\tau$ domain function. Through the iteration process, the probe $P^i(\tau)$ preferably adapts to assume the amplitude and phase of the input pulse. The sonogram is assumed to be the result of multiplying the probe elements $P^i_j(\tau)$ by the gate elements $G_j(\omega)$, where the index j identifies each of the N frequency channels and the index i identifies the number of the iteration. From this perspective, the sonogram is a set of N vectors.

As part of a characterization or initialization process for the FIG. 2 implementations, the method or apparatus preferably measures or retrieves a prior measurement of the gate $G(\omega)$. The system can measure each element $G_j(\omega)$ of the gate using a well-characterized or "known" pulse, for example, a test pulse generated using a pulse shaper to have a particular form, with that test pulse fully characterized using, for example, the frequency resolved optical gating (FROG) technique. A FROG apparatus capable of the desired measurements is commercially available from Mesa Photonics of Santa Fe, New Mexico Preferably, the known pulse is selected such that the intensity and phase will be constant across each frequency bin. The known pulse can be passed into the frequency filter (for the FIG. 1 filter or the filters of other embodiments) and the frequency filter's output preferably is measured using, for example, the detector 14 and the digitizer 30 of the FIG. 1 implementation to form a sonogram for the test pulse. The PIE process can then be applied by setting the known input pulse to be the input pulse, and the gate as the unknown quantity. This implementation of the PIE process assumes each of the gate elements is essentially the same. If, on the hand, the gate elements are different across the filter's range, more precise analysis of each gate element's spectra is needed to establish a "known" gate quantity. A blind algorithm such as the extended PIE or the PCGP algorithm can also be used to find the gate. If the gate changes and a known pulse is used such that the intensity and phase is effectively constant across each frequency bin, then measuring the temporal waveform and the spectrum of each can be used in a 1D phase retrieval to obtain the complex passband (intensity and phase) of each frequency bin. The measured frequency filter is then used as the gate elements $G_j(\omega)$ in each iteration of a preferred FIG. 2 procedure.

Preferably the first iteration through the FIG. 2 procedure uses initiation values for the probe. Starting the initial iteration, the FIG. 2 procedure preferably loads or uses 48 a noise modulated Gaussian as the initial form of the probe elements $P^i_j(\tau)$ and uses the measured or retrieved values of the gate elements $G_j(\omega)$. Subsequent iterations through the FIG. 2 procedure use the measured or retrieved values for the gate $G_j(\omega)$ and uses the prior iteration's guess or estimate for the probe $P^i_j(\tau)$. For each iteration, the next guess for the signal $\Psi_j(\omega)$ is formed by first Fourier transforming the probe element $P^i_j(\tau)$ to the frequency domain, $P^i_j(\omega)$, and point-by-point multiplying 49 the probe $P^i{}_j(\omega)$ by the shifted gate, $G(\omega-\omega_j)$, as designated at 49 in FIG. 2. $\omega_j$ is the set of translations between frequency slice positions. The product (signal) $\Psi_j(\omega)$ is Fourier transformed 50 to the time domain, $\Psi_j(\tau)$. The FIG. 2 procedure preferably next replaces 51 the modulus of the current value of the product $|\Psi_j(\tau)|$ with the square root of the measured intensity from the sonogram, retaining the then-current estimate of the phase, as shown in FIG. 2. The result, $\Psi'_j(\tau)$, is inverse Fourier transformed 53 to produce $\Psi'_j(\omega)$.

The procedure then updates 54 the probe element $P^i{}_j(\omega)$ values for the next frequency slice j, using:

$$P^i_{j+1}(\omega) = P^i_j(\omega) + \alpha \frac{G(\omega-\omega_j)}{|G(\omega-\omega_j)|^2_{max}}(\Psi'_j(\omega) - \Psi_j(w))$$

where $P_j(\omega)$ and $G_j(\omega)$ are the pulse and gate defined previously, $\omega_j$ is the set of translations, $\Psi_j(\omega)$ is the product of the object function and the translated probe before replacing the intensity with the measured data, and $\Psi'_{j(\omega)}$ is $\Psi_j(\omega)$ after replacing the modulus with the measured data. $\alpha$ is a constant that is typically set to one, but $\alpha$ may be varied to improve convergence. The above equation assumes that each of the gate elements is the same. If, on the other hand, the gate elements $G_j(\omega)$ vary, then the next iteration is given by:

$$P^i_{j+1}(\omega) = P^i_j(\omega) + \alpha \frac{G_j(\omega-\omega_j)}{|G_j(\omega-\omega_j)|^2_{max}}(\Psi'_j(\omega) - \Psi_j(w))$$

where $G_j(\omega)$ identifies the individual gate elements.

Processes 49-54 in FIG. 2 are repeated for each j of the N frequency channels. As set out in the equations of the prior paragraph, the next frequency slice j+1 analyzed is sequential (adjacent) to the prior analyzed frequency slice j. In some preferred embodiments, the next-to-be-analyzed frequency channel is selected randomly, so that the next channel is identified by j', which is randomly selected from the frequency slices that have not been analyzed. This randomization is useful to improve convergence and is particularly preferred for some of the variations on the PIE strategy, including what is known as the extended PIE. One iteration i of the FIG. 2 procedure is complete once all of the N vectors of sonogram data are used to complete the update of the probe function. The iterations are continued, generally until an appropriate error measure falls below a threshold level or subsequent iterations do not significantly change the pulse.

The FIG. 2 PIE procedure uses the previously determined value for the probe elements in updating the probe elements to be analyzed for the next frequency slice (j+1 or j'). That is, the probe elements are updated multiple times within one of the iterations i. This is particularly preferred in that it assists in convergence of the phase retrieval process.

There are variations on the PIE strategy that might be implemented as well. For example, the extended PIE (ePIE) assumes that both the probe and the gate are unknown. In the case of the ePIE, both functions are unknown and the function updates alternate between the unknown functions where each update uses all of the measured sonogram data.

While ptychography does not require sampling a waveform as frequently as the Fourier relationship used in typical ultrafast laser pulse phase retrieval algorithms, all of the frequency content of the sonogram needs to be interrogated. Consider, for example, a pulse with three spectral peaks all separated by a frequency $\Delta\omega$. If the measurement system uses a narrow frequency gating function that samples the spectrum only at the peaks; that is, the sampling is spaced at Aw and provides only information about the pulse near the peaks. Without any knowledge of the valleys, the signal spectrum would be reconstructed as a long broad spectrum. On the other hand, if the gate is broad enough to sample the valleys in addition to the near peak regions, all of the frequency information is sampled and enough frequency information would be recovered such that the entire waveform can be reconstructed.

Data acquisition preferably is designed a priori to ensure sufficient sampling will occur for the implementations used with ptychographic phase retrieval. Therefore, preferably the measurement system samples the pulse using a high bandwidth, long temporal window in which all of the frequency windows overlap. For multishot applications like that illustrated in FIG. 1, this is straightforward by appropriate translation of the slit to provide the desired overlap between each successive slit position. Overlap of the sampling windows is also obtained in the single shot configuration described below with respect to FIG. 5 using, for example, thermally adjustable array waveguide gratings.

For sonogram reconstructions, the gate is straightforward to measure. With a known gate, ptychographic reconstruction is very robust. If on the other hand the gate is not known, ptychographic reconstructions are not as robust and care must be taken to ensure convergence especially for long waveforms since the number of solutions to search is $\sim 2^{N-1}$, where N is the length of the recovered vector. If N becomes too large, then finding the solution without knowing the gate may be impossible unless fully sampled phase retrieval algorithms are used. Fully sampled phase retrieval strategies can also be used to find the gate to calibrate the system by using either a blind retrieval or a known input pulse. Pulses with limited bandwidth can be used to keep N small to allow for better convergence of the blind retrieval processes such as those that might be used in initially characterizing the gate as described above with respect to FIG. 2.

Figure 3:
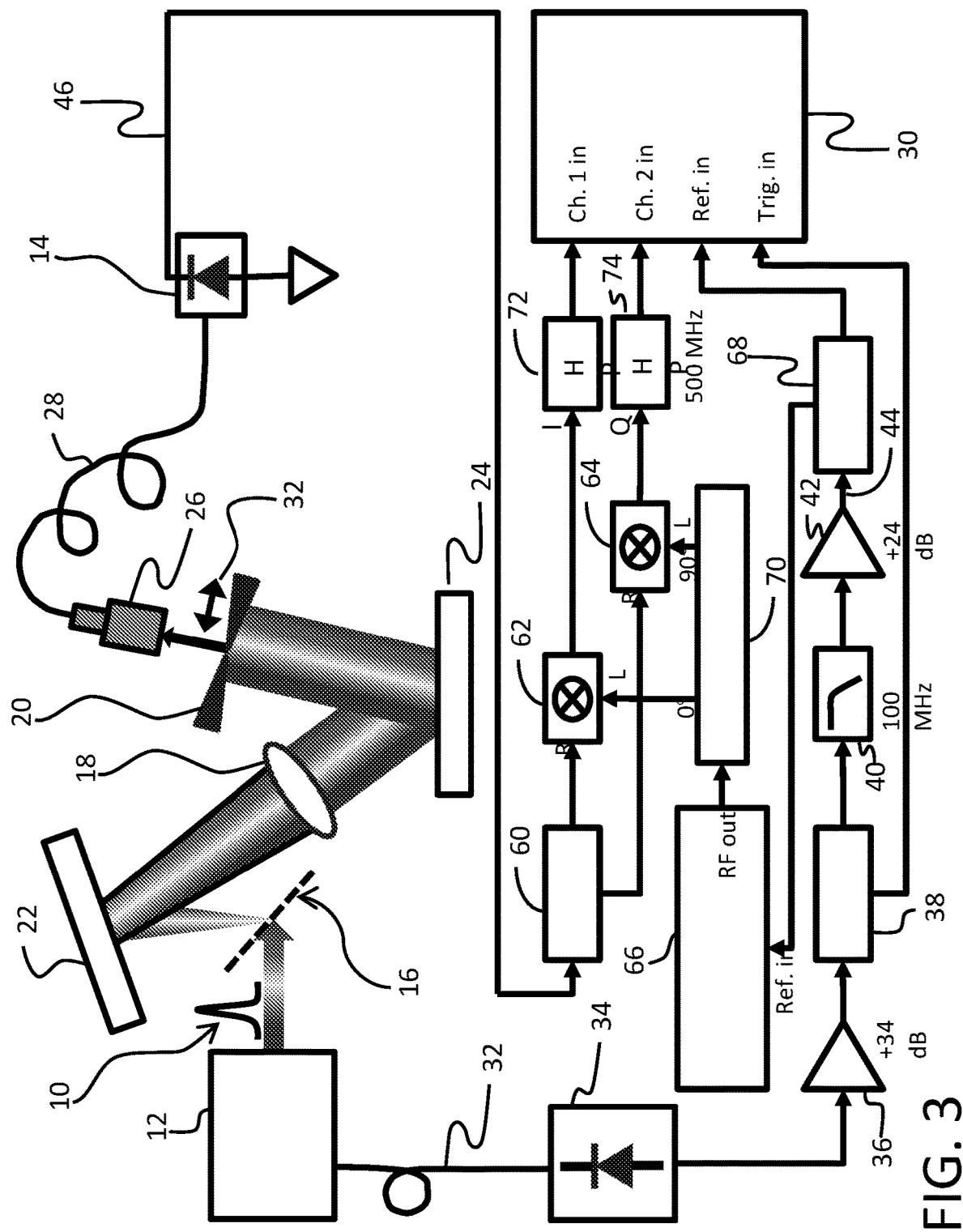
FIG. 3 illustrates a device and method to measure the sonogram of an ultrafast pulse where the output of a high-speed detector is mixed down to lower frequencies to detect and record the signal. Preferred implementations of the FIG. 3 strategy allow lower frequency electronics to record the high-speed signal at full bandwidth.

FIG. 3 illustrates aspects of another implementation of a system for acquiring sonogram data from an input ultrafast pulse under test. The FIG. 3 implementation receives an ultrafast pulse under test that is optically processed and provided to a 12 GHz photodiode 14. The FIG. 3 circuitry down-shifts the bandwidth of the signal acquired by the 12 GHz photodiode to the frequency range of the acquisition electronics (for example, 2.5 GHz). Shifting the bandwidth in this way allows these signals to be analyzed or at least to be analyzed with less expensive electronics.

FIG. 3 illustrates aspects of a modification to the FIG. 1 system and method with the same optics and optical functions as well as portions of the electronics that are the same and function the same. These common elements and functions are labeled with the same numbers as used in FIG. 1 and the description of the structures and their functions are not repeated here. As with the FIG. 1 illustration, photodiode 14 detects the intensity profile of a frequency selected slice of the pulse under test 10 and outputs that resulting analog signal 46. Splitter 60 (Mini Circuits) splits the 12 GHz photodiode 14 signal 46 into two equivalent signals, which are fed into the RF (radio frequency) inputs of two RF mixers 62, 64 (Marki). RF signal generator 66 (Berkeley Nucleonics) generates the local oscillator (LO) reference frequency signals for the mixers and provides those signals to mixers 62, 64, which mix the local oscillator reference signals with the split signal 46. With proper filtering of the output signal, each of the mixers 62, 64 acts as an RF input (signal 46) minus local oscillator (LO) difference frequency generator (from generator 66), thus down shifting the input signal frequency components by the LO frequency value. Preferably this difference signal is selected in a frequency range that facilitates use of lower frequency, lower bandwidth processing electronics. Equivalently, the FIG. 3 configuration allows the exemplary 2.5 GHz digitizer 30 to be used with higher frequency, higher bandwidth pulses 10.

The RF signal generator 66 reference frequency preferably is phase locked to the laser pulse train frequency. For example, the splitter 68 receives reference signal 44 derived from the monitor of the pulse source 12 and provides the split off signal to the RF signal generator 66, which uses the split off signal as a reference for generating its RF output. The FIG. 3 implementation preferably uses a universal frequency counter (not shown) to stabilize and confirm the local oscillator reference frequency ($\approx$100 MHz) as stable to better than 1 Hz.

To generate the LO waveforms phase shifted by 90°, which are necessary to acquire the in-phase (I) and quadrature (Q) Fourier components of the input signal, the RF signal generator 66 feeds its output to a 3 dB quadrature hybrid (Marki Microwave) 70. The quadrature hybrid 70 provides 0° and 90° outputs at the output frequency of the signal generator 66 to mixers 62, 64, which use those 0° and 90° outputs as local oscillator signals to generate the I and Q signals from the signal 46 detected by photodiode 14. Each mixer 62, 64 output is filtered using a band-pass filter formed by a combination of a 500 MHz high-pass filter 72, 74 and a 2.5 GHz low-pass filter at the input to the digitizer 30. Digitizer 30 operates under computer program control to acquire the I and Q waveforms (1024 data points each) at its channel 1 and 2 inputs. The digitizer 30 in this implementation can acquire the I and Q waveforms at a 5 GSPS rate while scanning the LO frequency. The control computer also scans the slit position to provide automated collection of frequency slice signals from the pulse under test.

Data obtained by the FIG. 3 implementation can be further processed, for example using the PIE as described above with respect to FIG. 2, to characterize the pulse under test. The group delay analysis discussed above with respect to FIG. 1 can also be applied to the FIG. 3 measurements.

Additionally, or as an alternative, for each wavelength (or frequency slice identified by the current slit position) the FIG. 3 system scans the LO frequency over 32 frequency points, each frequency value being a multiple of the laser pulse train frequency ($\approx$100 MHz, actual frequency is close to 99.652700 MHz)—typically from $\approx$1.8-14.6 GHz with a step of $\approx$0.4 GHz. The output of the photodiode can also be measured by a vector spectrum analyzer to provide the time-domain frequency filtered pulse. Such a vector spectrum analyzer configuration can be used without down converting the frequency filtered pulse and without other data acquisition electronics like the digitizer discussed above with respect to FIG. 1.

Figure 4:
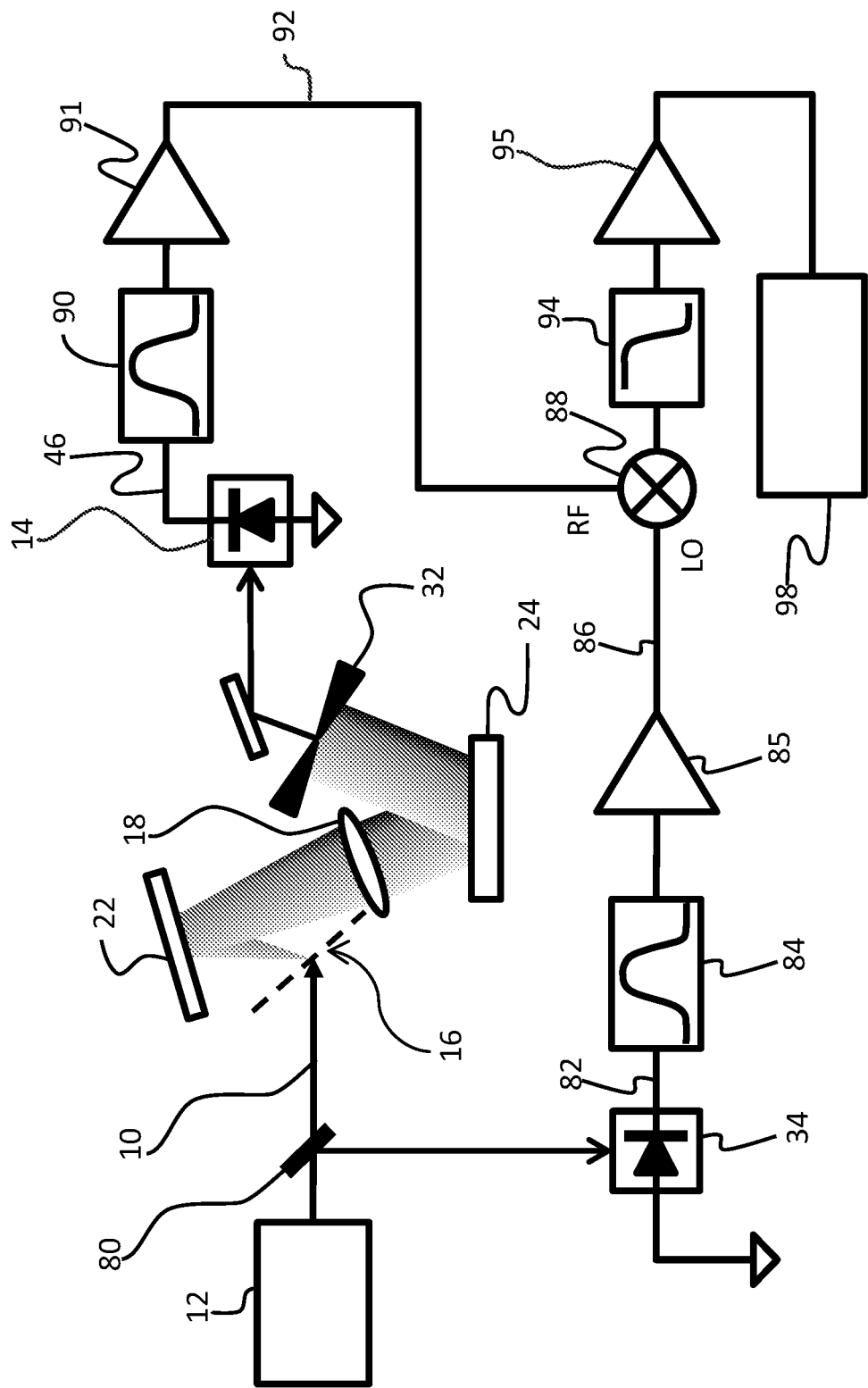
FIG. 4 is a schematic illustration of aspects of another device and method for measuring the arrival time. In this case the phase of a high-order harmonic is measured. In preferred implementations of this device and method, phase can be measured to very high precision.

FIG. 4 shows aspects of an implementation that measures the phase at higher-order harmonics of the repetition rate of the pulse under test 10. FIG. 4 illustrates aspects of a modification to the FIG. 1 system and method with the same optics and optical functions as well as portions of the electronics that are the same and function the same. These common elements and functions are labeled with the same numbers as used in FIG. 1 and the description of the structures and their functions is not repeated here. As with the FIG. 1 illustration, photodiode 14 detects the intensity profile of a frequency selected slice of the pulse under test 10 and outputs that resulting analog signal 46. As discussed as an alternative with respect to FIG. 1 but not illustrated there, the pulse under test 10 passes through splitter 80 to split off a monitor signal that is passed to reference photodiode 34, which generates reference pulse 82.

The reference pulse 82 is bandpass filtered 84 at a harmonic of the repetition rate of the laser or other ultrafast pulse source and amplified 85 as needed. The resulting reference pulse harmonic 86 is used as the local oscillator (LO) signal for a mixer 88. The frequency selected outputs from the photodiode 14 are also frequency filtered 90 at a harmonic of the pulse repetition rate and are then amplified 91 as needed. Preferably the harmonic for the bandpass filtering 90 is suitable to generate a frequency selected intensity profile harmonic 92 coupled to the RF input of mixer 88 for mixing with the local oscillator signal 86. The mixer 88 outputs a frequency difference signal 94 at a lower frequency compatible with a conventional digitizer or data acquisition system 98. The frequency difference signal 94 is also amplified 95 as needed before being input to the data acquisition system 98. The relative phases of the RF waveforms are determined and converted to an arrival time difference or relative arrival time. The arrival time can be further converted to a phase from the negative of the integral of the group delay with respect to frequency, which phase can then be combined with the spectral magnitude and Fourier transformed to provide the time domain pulse.

Additionally, or as an alternative, the FIG. 4 implementation may collect and organize data to provide a sonogram and that sonogram data can be further processed, for example using the PIE as described above with respect to FIG. 2, to characterize the pulse under test.

In another preferred implementation of the FIG. 4 system and method, the simple mixer 88 is replaced with I and Q mixers (similar to FIG. 3 mixers 62, 64) and associated signal conditioners and electronics as shown and discussed with respect to FIG. 3 above. The ratio of the I and Q outputs can provide the relative phase between the local oscillator and the RF input. Depending on the mixer used, different harmonics of the local oscillator frequency might be required. Because of the availability of well-suited bandpass filters for commercial wireless applications, this method may be a particularly preferred strategy for measuring the optical pulses. For example, surface acoustic wave and bulk acoustic wave filters are inexpensive and have a very narrow bandpass, which is particularly preferred for both the illustrated implementation and the I and Q waveform implementation of FIG. 4 discussed here. The bandpass should be about or less than the repetition rate of the laser. Bandpasses larger than the repetition rate of the laser can produce intensity fluctuations of the filtered signal. These signals can be processed to remove the modulation by using a limiter and an amplifier, for example. Such processing is similar to the capture effect used in FM radio receivers. Cavity filters can also be used, but they are larger and more expensive. LC filters can also be used, but the bandpass of the LC filters tends to be broader than the desired bandpass for this application.

FIG. 1 shows a scanning arrangement based on the frequency filter 16, 18 and 20, but in other implementations multiple wavelengths can be simultaneously recorded using multiple photodiodes and, in some embodiments, multiple digitizers. Parallel wavelength measurements can be implemented using commercially available array waveguide gratings (AWG) of the type used routinely in telecommunications applications. Array waveguide gratings can disperse and separate optical channels that can then be delayed and recombined using, for example, a second AWG. AWG dispersion devices can be temperature tuned to spectrally overlap, providing greater precision and flexibility to the measurement system. Another configuration, which is an alternative to the AWG configurations, includes a lensed fiber array positioned along the focal plane of a zero-dispersion frequency filter to facilitate parallel sampling. Either configuration samples the ultrafast pulse under test at a large number of frequency positions at the same time. In other words, the sampling is done in parallel.

Figure 5:
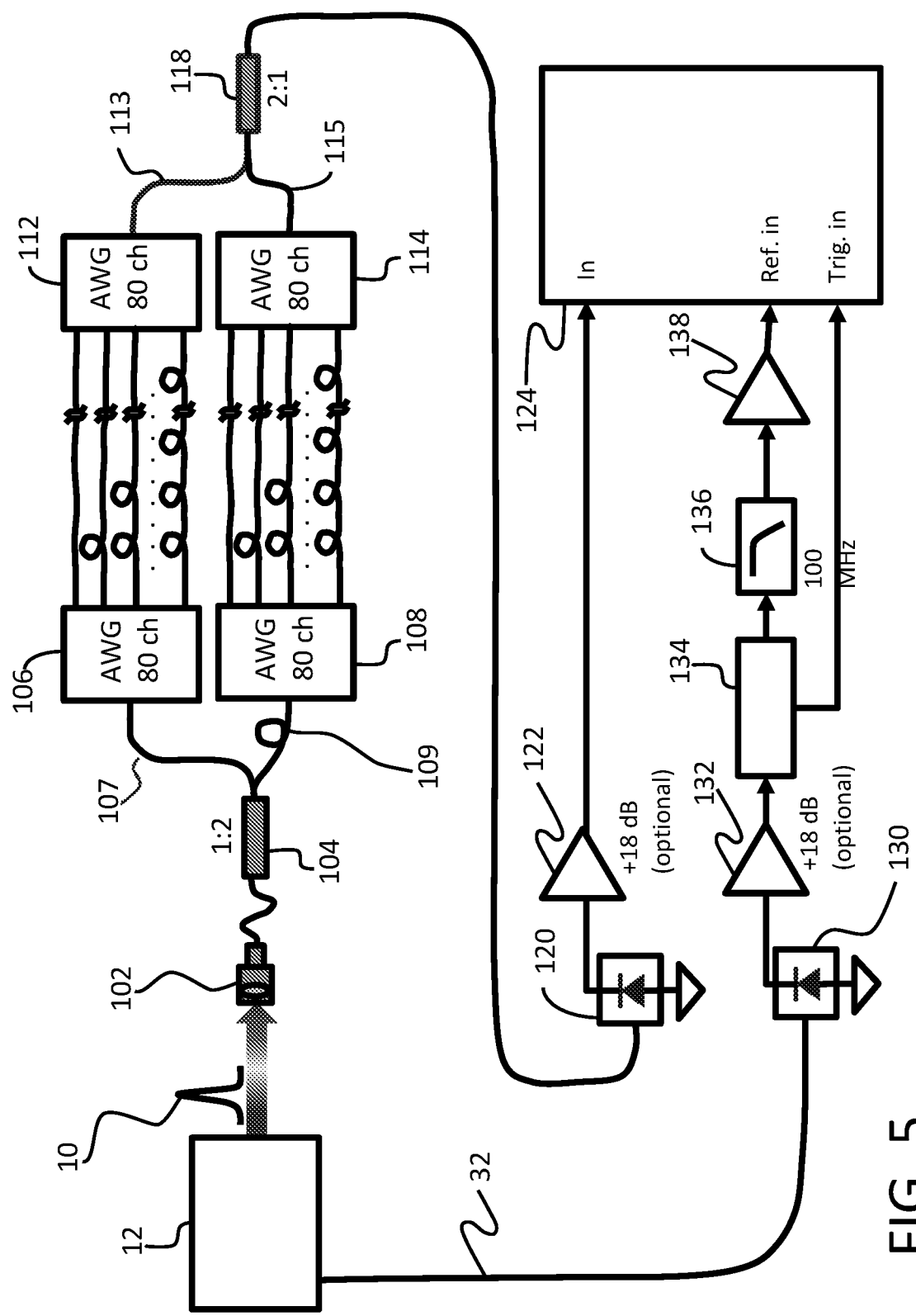
FIG. 5 is a schematic illustration that measures a sonogram using commercially available array waveguide gratings to facilitate acquiring in parallel multiple frequency slices from the input ultrafast pulse. The system preferably provides delay lines along each frequency channel to allow the system to multiplex the illustrated multiple frequency channels to one detector.

FIG. 5 shows an embodiment for single-shot data acquisition, where all of the frequency ranges of the pulse under test 10 preferably are sampled in a single, parallel operation. Different frequency components of the input pulse are sampled by using one or more array waveguide gratings (AWG). The FIG. 5 implementation uses array waveguide gratings and optical fibers to perform the frequency dispersion and selection instead of the frequency filter configuration illustrated in FIG. 1. Suitable array waveguide gratings (AWG) are commercially available, such as those used in optical communications networks, for a number of pulse sources of interest. Other devices and methods could be used instead of the illustrated array waveguide gratings, including a zero-dispersion spectrometer coupled to a fiber array. The array waveguide gratings are presently preferred because of their availability, their compact size, their low cost, and the ability to thermally tune the waveguides to provide flexibility.

FIG. 5 shows the pulse source 12 generating a pulse under test 10. As was the case for the FIG. 1 implementation, the FIG. 5 pulse source 12 generally produces the pulse under test 10 repeatedly and that repetition preferably is used here as well for averaging. Averaging is particularly preferred here given that the input ultrafast pulse under test is processed through a large number of parallel channels. Unlike the FIG. 1 implementation, the pulse repetition is not needed for scanning the frequency ranges in the FIG. 5 single-shot configuration. Here, as with the other implementations, the discussion is in terms of optical pulses, with the specific examples discussed here of infrared ultra-high-speed pulses. Other pulses, whether optical or more broadly electromagnetic, may benefit from the measurement and analysis strategies discussed here if they have suitably short durations. As such, the term optical here is to be understood broadly as including electromagnetic waves that can be dispersed using gratings or array waveguides or similar dispersion elements.

The FIG. 5 pulse under test 10 is provided to coupling and collimating optics 102, which couples the pulse under test 10 into an optical fiber that provides the pulse under test to 1:2 splitter 104, which preferably divides the input pulse into two generally equal components. Each of the two pulse components is coupled to a corresponding input for an array waveguide grating 106, 108 through lengths of optical fiber 107, 109, with a different length of fiber 107, 109 between the splitter 104 and the AWG 106, 108. AWGs 106, 108 are arranged to disperse the signal at their input into eighty different and generally contiguous frequency ranges. The different lengths of the fibers 107, 109 serve two purposes: (1) they provide an arrival time delay between the two components so that the two input, dispersion AWGs 106, 108 receive different frequency passbands selected from the pulse under test 10; and (2) they provide a delay between each of the two sets of signals provided to the two AWGs 106, 108 so that the signals eventually output by the second, recombining AWGs 112, 114 occupy different time windows. This allows the recombined signals (two sets of eighty signals in this illustration) to be distinguished and serially processed by a detector and processing system.

The illustrated AWGs 106, 108 have eighty channels into which the received input signal is divided, with each successive signal component dispersed to provide and sample a different frequency span within the eighty channels that together span a total frequency range for the AWG. This illustration is of two eighty-channel AWGs for a total of 160 channels dispersed in frequency, but this is a matter of design and AWGs with different numbers of channels can be used and a different number of AWGs can be used. Each of the outputs from the dispersive AWGs 106, 108 is connected to the corresponding input of a recombining AWG 112, 114 by a length of optical fiber. Each of the fiber segments from dispersive AWG 106 to recombining AWG 112 has a different length so that the eighty channels will occupy a different time slot in the signal output from combiner 118. For simplicity in discussing the implementation, the illustrated implementation provides each successive channel a longer length of fiber than the preceding channel. The different length fibers act as delay lines. While the different length fibers are particularly preferred at this time, the preferred delay lines may be implemented in different ways.

Because the fibers 107, 109 preferably delay the signals prior to input to the AWGs, the sets of fibers between corresponding pairs of dispersive input and recombining output AWGs have the same sets of lengths. That is, the fibers between AWG 106 and AWG 112 preferably have the same set of eighty different lengths as between AWG 108 and AWG 114. The length of the fibers 107, 109 between the splitter 104 and the AWGs 106, 108 is selected to accommodate the total delay associated with the eighty individual delays between the corresponding sets of dispersive input AWGs and recombining output AWGs.

At this point, there are 160 parallel channels of frequency-selected pulse slices, each with a selected delay. The signals from the 160 channels of fibers between the two sets of AWGs are recombined in AWGs 112, 114 and provided to the combiner (multiplexer) 118. The result is a sequence of 160 frequency selected slices of the pulse under test on the optical fiber output in time multiplexed series from the combiner 118. This configuration samples the pulse under test through 160 sampling bins spanning a total frequency range over the pulse under test and outputs the samples to the output fiber in an organized series of frequency-slice samples within an optical signal. The optical signal on the output fiber preferably is provided to a high-speed detector such as high-speed (greater than the passband of 38-40 GHz) photodiode 120.

The photodiode 120 output is provided to an amplifier 122, which may be needed in some circumstances since the input pulse power is divided and distributed in time. The signal from the amplifier 122 is provided to data acquisition electronics such as an analog to digital (ADC) card or an oscilloscope 124 for processing, preferably in conjunction with a control and analysis computer, as discussed above with respect to FIG. 1. Each frequency slice set of samples detected by the photodiode 120 has a unique delay so that its signal can be digitized at a different time. Because of the different timing offsets of each wavelength component from the AWGs or delay fibers, the system preferably is first calibrated using a transform limited pulse to, among other things, precisely establish the relative delays and timing between the different frequency channels.

Detector 130 (e.g., a 25 GHz photodiode or lower bandwidth as in FIG. 1) receives a monitor signal 32 from the pulse source 12 corresponding to the pulse under test, detects the signal and outputs the signal to amplifier 132. This monitor signal 32 is like that described above with respect to FIG. 1. Splitter 134 splits the amplified signal output by amplifier 132; one component of the split signal is provided to the data acquisition electronics 124's trigger input. The other component of the monitor pulse signal from the splitter 134 is low pass filtered by low pass filter 136 and then passed to amplifier 138, which amplifies the signal and provides the result to the reference signal input of data acquisition electronics 124 as the timing reference. RF attenuators are used as needed to match the input power requirements of the RF components. Using the pulse source 12 to generate a reference signal for the data acquisition electronics 124 is particularly preferred to improve timing accuracy and is used in the manner discussed above with respect to FIG. 1. On the other hand, the FIG. 5 system can be implemented without such a trigger signal or reference signal.

For this single shot system in the telecom region, the narrowest commercially available AWGs have channels with widths of about 38-40 GHz, with the channels spaced at about 50 GHz apart. Thus, in this configuration, the detector 120 with a bandwidth of 25 GHz can be used in making group delay measurements of the phase (as discussed above with respect to FIG. 1) but the detector has insufficient bandwidth to obtain data appropriate to the PIE phase retrieval strategy described above with respect to FIG. 2. For the PIE implementation, the detector 120 bandwidth should be greater than the passband of each frequency bin, or greater than 38-40 GHz. Preferably, the 50 GHz spacing of the FIG. 5 AWGs is reduced to 25 GHz to ensure that all the frequency content is interrogated. Even though the ITU grid is set at minimum spacing of 50 GHz, the operating temperature of the thermal AWGs can be changed to shift the optical bandpasses off the ITU grid. This allows two AWGs, one thermally shifted and the other not thermally shifted, to sample the pulse at overlapping, interleaved intervals so that the combined AWG structure has channels that are spaced 25 GHz apart, allowing detector 130 to obtain data appropriate for the analysis of FIG. 2. The bandpasses of a thermal AWGs can also be changed sufficiently to achieve the desired overlap and interleaving by applying a temperature gradient across the AWG. Custom AWGs could be used instead of the commercial AWGs discussed here but are currently less practical.

The configuration of FIG. 5 discussed to this point, which provides frequency channels that generally do not overlap in frequency, is acceptable and in some cases preferred for when the measured sonogram and other data are analyzed using the group delay strategy discussed above with respect to FIG. 1. On the other hand, when the FIG. 2 or similar phase retrieval strategy is implemented on sonogram or similar data obtained by the FIG. 5 implementation, it is preferred that the AWGs be further specified to provide frequency overlap between the frequency channels so that the frequency range of the filter is continuously sampled. In this overlap configuration, AWGs 106 and 108 are used to create interleaved frequency channels, with one channel from AWG 106 being inserted between and overlapping each adjacent channel defined by AWG 108, ignoring the ends of the AWGs where there will be a mismatch. Because each AWG has frequency channels of about 38-40 GHz width spaced 50 GHz apart, the interleaved channel configuration preferably provides channels spaced 25 GHz apart with that same 38-40 GHz width, providing frequency overlapping channels over the total frequency range defined by one of the AWGs, such as AWG 106.

To accomplish this overlapping configuration, the lengths of the fibers 107, 109 may be selected to be the same and AWGs 106, 108 selected to span the same frequency range. Because the time intervals can be measured, fibers 107, 109 need not have the same length, but that configuration is selected for ease of discussion. One of the input AWGs, for example AWG 106, is heated to shift the center of each channel's passband by 25 GHz. Variations in the shift are acceptable, but it is preferably near 25 GHz. Heating the AWG 106 causes the center frequency of all of the channels to shift in the same way and by the same amount. The present inventor has observed that this amount of shift is readily achievable, repeatable and sustainable with commercially available thermal AWGs. This level of shift can also be achieved in the same manner using nominally a thermal AWGs by applying a temperature gradient to the AWG. The corresponding output AWG, for example AWG 112, is also heated, to the same degree to achieve the same shift, which properly aligns the frequency passbands and maintains a desired channel structure. It is desirable to space the output signals from AWGs 112, 114 by sufficient time to prevent the output signals from the two AWGs from overlapping in the output series optical signal. This can be accomplished by making the output fibers 113, 115 different lengths so that one functions as a sufficient delay line with respect to the other fiber line.

The data acquisition system 124 then receives a continuous signal containing out-of-sequence frequency slice samples from the frequency filter. The signal preferably is digitized and stored to make up a sonogram. The frequency slices may be arranged in order if that is useful for the sonogram analysis, but that is not required. As suitable for the pulse and the desired level of analysis, it may be desirable to add additional AWGs in complementary shifted and unshifted sets.

At other wavelength regions, away from the convenience of the telecommunications band and where AWGs may not be readily available, such as near 1 um where many high-power laser systems operate, systems such as linear arrays of lensed fibers can be used for single-shot systems.

Delays from the fibers in the FIG. 5 frequency dispersion system require a fairly large time window depending on the needs (e.g., digitizing and storage) of the system. For example, if the length of fiber for each wavelength channel is increased with an increment of 1 meter, the time interval between successive wavelength pulses is about 5 nanoseconds. The delay preferably adds negligible dispersion although the dispersion can be mathematically removed. If each channel of the combined (shifted and unshifted) AWGs is separated by 25 GHz and 150 channels are used, then the entire time window is about 5 nanoseconds and the frequency span of the measurement is about 3.75 THz.

After the single shot waveform is digitized, the intensity versus time samples for each frequency slice are identified and, as desired, organized into a data structure corresponding to a sonogram. The sonogram data are then analyzed using, for example, the group delay analysis discussed above with respect to FIG. 1 or the phase retrieval strategy described above with respect to FIG. 2.

Figure 6:
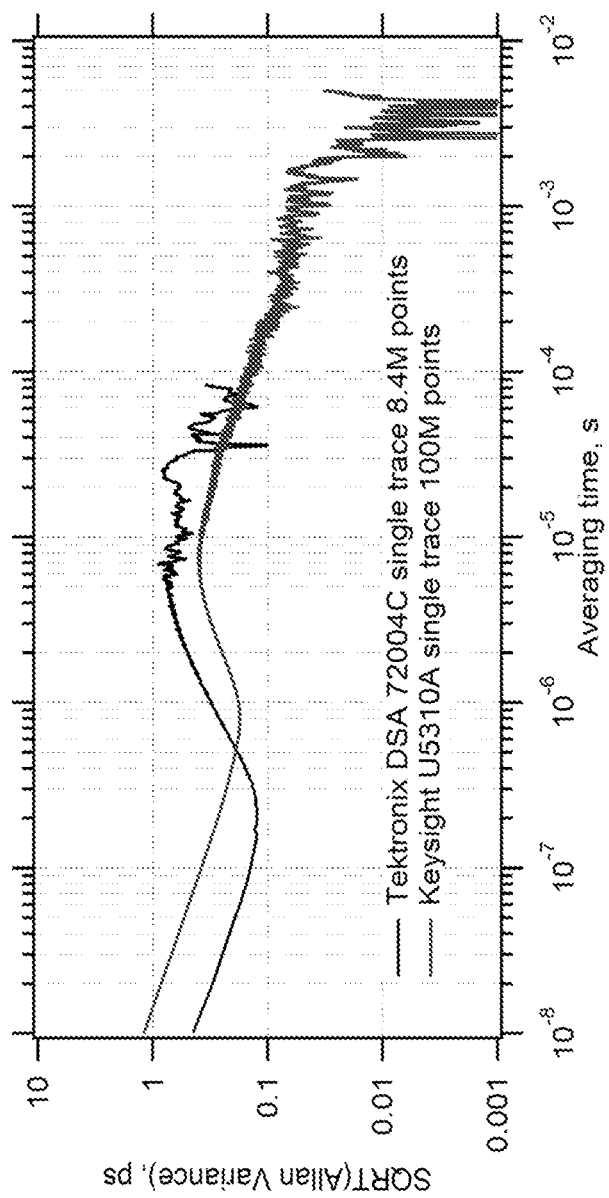
FIG. 6 shows the Allan variance of arrival time measures using preferred implementations of aspects of the present invention. By averaging the data, preferred implementations can obtain arrival time precision of nearly 10 fs, which is sufficient to measure ultrafast optical pulses.

Some preferred implementations average the detected, frequency selected pulse data to improve the precision of the arrival time measurements. FIG. 6 shows the results of averaging experiments based on the FIG. 1 configuration, using group delay measurements and two different data acquisition systems. For this testing the FIG. 1 photodiodes were replaced by 25-33 GHz photodiodes or photoreceivers. The two data acquisition systems used included a 2.5 GHz data acquisition card from Keysight Technologies (the same as the digitizer 30 of FIG. 1), indicated as the lighter trace in FIG. 6, and a Tektronix 20 GHz oscilloscope, identified as a darker black line in FIG. 6. The graph of FIG. 6 shows unexpectedly close performance between the two systems, despite the oscilloscope's eight times better bandwidth. For longer averaging times, the nominally slower Keysight data acquisition card performs better than the digitizing oscilloscope. This suggests that the limits on data acquisition are primarily related to the jitter in the aperture of the analog to digital converter, and not to the bandwidth of the processing electronics.

Both data sets in FIG. 6 show a falling Allan variance as a function of averaging time, demonstrating increasing precision. In this illustration the data are averaged before performing the correlation between the response function and the intensity profile of the frequency selected pulse slices. Correlations could be averaged as well. Preferred implementations provide sufficient averaging to obtain arrival time precision of nearly 10 fs, which is sufficient to measure very short optical pulses, such as a 10 fs pulse.

Real-time oscilloscopes and digitizers were used to acquire the data for most of the experiments discussed here. The data can also be acquired using sampling oscilloscopes provided the jitter performance is good and single-shot performance is not required.

The above examples have illustrated various strategies for sampling a pulse under test at a number of frequencies over the total frequency range of the pulse. Other sampling strategies might alternately be used, including passing the pulse under test through a number of frequency bandpass filters coupled to one or more detectors. This configuration can sample multiple pulses to allow the number of filters to sample sufficient numbers of frequency ranges.

Several considerations must be taken into account when optimizing a system. In addition to optimizing signal-to-noise, other considerations that impact system performance include the optical bandpass, the electronics bandpass, the aperture jitter, the bit depth, and the digitizer speed. The total system bandwidth is determined by the product of the optical bandwidth and the electronics bandwidth. For example, if the optical bandwidth is wide, but the electronics bandwidth is narrow, the total system bandwidth is mostly determined by the electronics bandwidth. Aperture jitter is one of the parameters that determines analog-to-digital converter performance and can sometimes be the limiting parameter. High-bit depths require low aperture jitter just as high-speed digitizers require low aperture jitter.

If only time arrival (group delay) is required, then considerations are relaxed, and total bandwidth is not as important and neither is spacing between frequency samples. For time arrival, the primary consideration is aperture jitter of the analog-to-digital converter. A 16-bit, 1 gigasample per second (GSPS) analog-to-digital converter may provide better results than an 8-bit 3 GSPS analog-to-digital converter. For full reconstruction of the waveform at enhanced resolution, considerations are more complex. Time arrival is still important. Jitter results in a loss of phase information and adds phase noise and so needs to be limited. The frequency sampling should use overlapping bands for phase reconstruction to work, and enough frequency sampling needs to be obtained to ensure uniqueness.

Although the invention has been described in detail with particular reference to these preferred embodiments, other embodiments can achieve the same results. Variations and modifications of the present invention will be apparent to those skilled in the art. The present invention is not defined by the various embodiments described here but is instead defined by the claims, which follow.

What is claimed is:

1. An ultrafast pulse analysis apparatus, comprising:
a frequency filter that receives one or more pulses under test and disperses the one or more pulses under test over a total frequency range, the frequency filter passing a first pulse portion of a dispersed pulse under test at a first position, the first pulse portion extending over a first portion of the total frequency range, the frequency filter passing a second pulse portion of a dispersed pulse under test at a second position distinct from the first position, the second pulse portion extending over a second portion of the total frequency range;
a detector coupled to receive output pulse portions from the frequency filter and output electrical pulse signals corresponding to the one or more pulses under test;
collection optics optically coupled to the frequency filter to direct the output pulse portions to the detector; and
analysis electronics coupled to receive and digitize the electrical pulse signals, the analysis electronics storing a sonogram corresponding to the one or more pulses under test wherein the sonogram comprises sequences of digitized values of the electrical pulse signal, the digitized values within sequences obtained at time intervals, the sequences obtained at a plurality of frequency ranges including the first and second portions of the total frequency range, each of the plurality of frequency ranges corresponding to at least one sequence of digitized values of the electrical pulse signals, wherein frequency spacing of the plurality of frequency ranges is selected independently of the time intervals,
wherein bandwidths of the detector and of a digitizing portion of the analysis electronics are larger than a frequency resolution of the frequency filter, and
wherein the analysis electronics is adapted to perform phase retrieval on the sonogram.

2. The ultrafast pulse analysis apparatus of claim 1, wherein the sonogram is obtained over a bandpass bounded on a lower side by a frequency resolution of the frequency filter and bounded on an upper side by a reciprocal of acquisition jitter of the digitizing portion of the analysis electronics.

3. The ultrafast pulse analysis apparatus of claim 1, wherein the plurality of frequency ranges samples all frequencies of the total frequency range and wherein the first portion of the total frequency range partially overlaps the second portion of the total frequency range.

4. The ultrafast pulse analysis apparatus of claim 1, wherein the sonogram is produced by averaging digitized signals corresponding to a plurality of pulses under test.

5. The ultrafast pulse analysis apparatus of claim 1, wherein the frequency filter comprises:
a dispersion element for receiving the one or more pulses under test and dispersing the one or more pulses under test according to frequency over a total frequency range; and
a slit coupled to a computer-controlled translation stage adapted to translate the slit between the first position and the second position, wherein the collection optics are translated under computer control between positions corresponding to translation of the slit between the first and second positions, the slit opening corresponding to the first portion of the total frequency range.

6. The ultrafast pulse analysis apparatus of claim 1, wherein the phase retrieval uses a steepest descents strategy.

7. The ultrafast pulse analysis apparatus of claim 1, wherein the phase retrieval uses ptychography.

8. The ultrafast pulse analysis apparatus of claim 1, wherein the frequency filter comprises at least one array waveguide and the at least one array waveguide passes the first and second pulse portions through physically separated frequency channels.

9. The ultrafast pulse analysis apparatus of claim 8, further comprising a plurality of delay elements coupled to receive pulse portions from the at least one array waveguide and to delay pulse portions with respect to other pulse portions so that the delay elements output a first pulse portion comprising the first portion of the total frequency range delayed by a time interval with respect to a third pulse portion comprising a third portion of the total frequency range.

10. The ultrafast pulse analysis apparatus of claim 8, wherein the at least one array waveguide is coupled to a thermal element that adjusts frequency positions of frequency channels defined by the at least one array waveguide.

11. An ultrafast pulse analysis apparatus, comprising:
a sampling system receiving at least one pulse under test, the sampling system defining a plurality of sampling windows each spanning a frequency range of the at least one pulse under test, the plurality of sampling windows arranged over different frequency ranges so that the plurality of sampling windows define a continuous frequency range over at least a portion of a total frequency range of the at least one pulse under test;
collection optics receiving a plurality of pulse portions, each pulse portion derived from the at least one pulse under test from a frequency range corresponding to one of the sampling windows;
one or more detectors coupled to receive the plurality of pulse portions from the collection optics and to output electrical pulse signals corresponding to each of the plurality of pulse portions; and
analysis electronics coupled to receive and digitize the electrical pulse signals, the analysis electronics storing a sonogram corresponding to the at least one pulse under test wherein the sonogram comprises sequences of digitized values of the electrical pulse signals at time intervals so that spacing of the time intervals is independent of frequency intervals between the plurality of sampling windows, the digitized values within a sequence corresponding to the pulse portion defined by one of the sampling windows,
wherein the detector has a bandwidth greater than the frequency range of each of the sampling windows defined by the sampling system and wherein the analysis electronics has a bandwidth larger than the frequency range of each of the sampling windows defined by the sampling system, and
wherein the analysis electronics performs phase retrieval on the sonogram.

12. The ultrafast pulse analysis apparatus of claim 11, wherein at least two of the plurality of sampling windows having different center frequencies have different frequency intervals.

13. The ultrafast pulse analysis apparatus of claim 11 wherein adjacent ones of the sampling windows partially overlap in frequency ranges.

14. The ultrafast pulse analysis apparatus of claim 11, wherein the analysis electronics is adapted to store characterizations of the plurality of sampling windows and to retrieve and use the characterizations as part of phase retrieval.

15. The ultrafast pulse analysis apparatus of claim 11, wherein the sonogram is obtained over a pass band bounded on a lower side by the frequency range of each of the sampling windows and bounded on an upper side by a reciprocal of acquisition jitter of the analysis electronics.

16. The ultrafast pulse analysis apparatus of claim 15, wherein the sonogram is produced by averaging digitized signals corresponding to a plurality of pulses under test.

17. The ultrafast pulse analysis apparatus of claim 11, wherein the sampling system comprises:
a dispersion element for receiving the at least one pulse under test and dispersing the at least one pulse under test according to frequency over the total frequency range; and
a slit coupled to a computer-controlled translation stage adapted to translate the slit, wherein the collection optics are translated under computer control between positions corresponding to translation of the slit.

18. The ultrafast pulse analysis apparatus of claim 11, wherein the phase retrieval uses ptychography.

19. The ultrafast pulse analysis apparatus of claim 11, wherein the sampling system comprises at least one array waveguide and the sampling system passes the plurality of pulse portions in parallel.

20. The ultrafast pulse analysis apparatus of claim 19, further comprising a plurality of delay elements coupled to receive pulse portions from the array waveguide and to delay pulse portions with respect to other pulse portions.

21. The ultrafast pulse analysis apparatus of claim 19, wherein the array waveguide is coupled to a thermal element that adjusts frequency positions of frequency channels defined by the array waveguide.

22. The ultrafast pulse analysis apparatus of claim 19, wherein adjacent ones of the sampling windows partially overlap in frequency ranges.

* * * * *